(12) United States Patent
Rohloff

(10) Patent No.: US 9,338,144 B2
(45) Date of Patent: *May 10, 2016

(54) SYSTEM AND METHOD FOR OPERATING ON STREAMING ENCRYPTED DATA

(71) Applicant: RAYTHEON BBN TECHNOLOGIES CORP., Cambridge, MA (US)

(72) Inventor: Kurt Ryan Rohloff, South Hadley, MA (US)

(73) Assignee: RAYTHEON BBN TECHNOLOGIES CORP., Cambridge, MA (US)

(*) Notice: Subject to any disclaimer, the term of this patent is extended or adjusted under 35 U.S.C. 154(b) by 84 days.

This patent is subject to a terminal disclaimer.

(21) Appl. No.: 14/184,552

(22) Filed: Feb. 19, 2014

(65) Prior Publication Data
US 2015/0237020 A1 Aug. 20, 2015

(51) Int. Cl.
*H04L 9/32* (2006.01)
*H04L 29/06* (2006.01)

(52) U.S. Cl.
CPC ............ *H04L 63/0428* (2013.01); *H04L 67/42* (2013.01)

(58) Field of Classification Search
CPC .................................................. H04L 63/0428
USPC ......................................................... 713/168
See application file for complete search history.

(56) References Cited

U.S. PATENT DOCUMENTS

| | | | |
|---|---|---|---|
| 6,477,652 B1 | 11/2002 | Yen et al. | |
| 6,986,044 B1 | 1/2006 | Inada | |
| 7,054,327 B2 | 5/2006 | Hagirahim et al. | |
| 7,236,483 B2 | 6/2007 | Yeom | |
| 7,742,499 B1 | 6/2010 | Erskine et al. | |
| 7,778,251 B2 | 8/2010 | Ozaki | |
| 7,936,781 B2 | 5/2011 | Ozaki | |
| 8,363,744 B2 | 1/2013 | Agee et al. | |

(Continued)

OTHER PUBLICATIONS

"Secure Voice over IP (SVoIP) vs. Voice over Secure IP (VoSIP) Installations", General Dynamics, C4 Systems, 2010 (4 pgs.).

(Continued)

*Primary Examiner* — Morshed Mehedi
*Assistant Examiner* — Khalil Naghdali
(74) *Attorney, Agent, or Firm* — Lewis Roca Rothgerber Christie LLP

(57) ABSTRACT

Method for data privacy in a distributed communication system includes: receiving first and second encrypted data from first and second client terminals, each having a different data representation; analyzing the first and second data representations to determine a common data representation; translating the first and second encrypted data to a shared data representation using the common data representation; performing operations on the first encrypted data and second encrypted data to generate a first and second operated encrypted data; reverting the first operated encrypted data back to said first data representation and sending the reverted first encrypted date to the first client terminal for decryption by the first client terminal; and reverting the second operated encrypted data back to said second data representation and sending the reverted second encrypted date to the second client terminal for decryption by the second client terminal.

15 Claims, 6 Drawing Sheets

(56) References Cited

U.S. PATENT DOCUMENTS

| | | |
|---|---|---|
| 8,379,865 B2* | 2/2013 | Frindell et al. ............... 380/279 |
| 2003/0044004 A1* | 3/2003 | Blakley et al. ................. 380/28 |
| 2003/0044017 A1 | 3/2003 | Briscoe |
| 2003/0142818 A1* | 7/2003 | Raghunathan et al. ........... 380/1 |
| 2003/0163697 A1 | 8/2003 | Pabla et al. |
| 2006/0126830 A1* | 6/2006 | Shimizu ......................... 380/28 |
| 2009/0063861 A1 | 3/2009 | Chu |
| 2010/0220856 A1 | 9/2010 | Kruys et al. |
| 2010/0232603 A1* | 9/2010 | Itoh ............................... 380/30 |
| 2012/0054485 A1* | 3/2012 | Tanaka .................. H04L 9/008 713/150 |
| 2012/0213359 A1* | 8/2012 | Troncoso Pastoriza et al. ............................. 380/28 |
| 2013/0216044 A1 | 8/2013 | Gentry et al. |
| 2013/0272521 A1 | 10/2013 | Kipnis et al. |
| 2013/0318347 A1 | 11/2013 | Moffat |
| 2014/0294174 A1* | 10/2014 | Pulkus ........................... 380/28 |
| 2014/0334624 A1 | 11/2014 | Bernsen |
| 2015/0078150 A1* | 3/2015 | Moreno De Ayala et al. ........................... 370/208 |

OTHER PUBLICATIONS

Dunte, et al., "Secure Voice-over-IP", IJCSNS International Journal of Computer Science and Network Security, vol. 7, No. 6, Jun. 2007 (pp. 63-68).

Gentry, "A Fully Homomorphic Encryption Scheme", Dissertation Submitted to the Department of Computer Science and the Committee on Graduate Studies of Stanford University in Partial Fulfillment of the Requirements for the degree of Doctor of Philosophy, Sep. 2009 (209 pgs.).

Gentry, "Computing Arbitrary Functions of Encrypted Data", Communications of the ACM, vol. 53, No. 3, Mar. 2010 (pp. 97-105).

Gentry, et al., "A Working Implementation of Fully Homomorphic Encryption", IBM T.J. Watson Research Center, 2009 (5 pgs.).

Halevi, et al., "Design and Implementation of a Homomorphic-Encryption Library", Apr. 11, 2013 (46 pgs.).

Lyubashevsky, et al., "A Toolkit for Ring-LWE Cryptography", May 16, 2013 (51 pgs.).

* cited by examiner

SYSTEM AND METHOD FOR OPERATING ON STREAMING ENCRYPTED DATA

STATEMENT REGARDING FEDERALLY SPONSORED RESEARCH

This invention disclosure is related to a government contract number FA8750-11-C-0098. The U.S. Government has certain rights to this invention.

FIELD OF THE INVENTION

The present invention relates to data privacy and encryption and more specifically to a system and method for operating on streaming encrypted data having different bandwidth or frame size.

BACKGROUND

A typical system for enabling multiple entities to exchanging data or communicate with one another may include a form of a distributed communication system, in which multiple parties to a communication are connected to each other through a network and a central hub or switch. In many circumstances, where that data being exchanged includes sensitive information, it is important to maintain privacy from external security threats. Additionally, in some circumstances, the network itself may not be reliably secure or trustworthy. For example, various parties engaging in a teleconference may be speaking about sensitive information from various trusted locations throughout the world, but the telecommunication system or the central data mixer used to transmit data between the parties may not be secure or trustworthy.

There has been prior work on the mixing of data of different rates, however none of those approaches are compatible with the homomorphic encryption scheme such that privacy-preserving mixing can be performed, for example, for encrypted voice over IP (VoIP).

Moreover, these prior approaches do not cover encrypted VoIP teleconferencing, where encryption keys do not need to be shared with a VoIP mixer, in a manner that scales linearly with the number of participants (clients). Many consumer VoIP solutions do not support encryption of the signaling path or the media. As a result, the lack of encryption is a relative easy to eavesdrop on VoIP calls when access to the data network is possible.

SUMMARY OF THE INVENTION

In some embodiments, the present invention is a computer implemented method for data privacy in a distributed communication system. The method includes: receiving first encrypted data from a first client terminal, the first encrypted data having a first data representation; receiving second encrypted data from a second client terminal, the second encrypted data having a second data representation different than the first data representation; analyzing the first and second data representations to determine a common data representation for both first and second encrypted data; translating the first and second encrypted data to a shared data representation using said common data representation; performing operations on the first encrypted data and second encrypted data having the common data representation to generate a first operated encrypted data and a second operated encrypted data having the shared data representation; reverting the first operated encrypted data back to said first data representation and sending the reverted first encrypted date to the first client terminal for decryption by the first client terminal; and reverting the second operated encrypted data back to said second data representation and sending the reverted second encrypted date to the second client terminal for decryption by the second client terminal.

In some embodiments, the present invention is a mixer for data privacy in a distributed communication system. The mixer includes: a first input port for receiving first encrypted data from a first client terminal, the first encrypted data having a first data representation; a second input port for receiving second encrypted data from a second client terminal, the second encrypted data having a second data representation different than the first data representation; a selector circuit for analyzing the first and second data representations to determine a common data representation for both first and second encrypted data; a first and a second homogenizers for translating the first and second encrypted data to a shared data representation using said common data representation, respectively; an operational circuit for performing operations on the first encrypted data and second encrypted data having the common data representation to generate a first operated encrypted data and a second operated encrypted data having the shared data representation; a first reverter for reverting the first operated encrypted data back to said first data representation and sending the reverted first encrypted date to the first client terminal for decryption by the first client terminal, respectively; and a second reverter for reverting the second operated encrypted data back to said second data representation and sending the reverted second encrypted date to the second client terminal for decryption by the second client terminal.

In some embodiments, the first data representation includes a first cyphertext ring dimension and the second data representation includes a second cyphertext ring dimension.

Analyzing the first and second data representations may include measuring ring dimension for the first encrypted data and the second encrypted data to determine a shared ring dimension for both first and second encrypted data. In some embodiments, the shared ring dimension may be the minimum or the maximum of all the ring dimensions for the first and second encrypted data.

In some embodiments, analyzing the first and second data representations includes measuring data rate for the first cyphertext vector and the second cyphertext vector to determine a shared ring dimension or a shared vector size for both first and second encrypted data.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the present invention is directed to a system and method for encoding, mixing, decrypting and decoding streaming encrypted data. In some embodiments, the present invention is a system and method for parties (e.g., several client terminals) to a distributed communication session (using communication terminals) to have privacy-preserving communications, where communication privacy is maintained despite all communications of the client terminals (clients) being observed during the communications, even at a communications mixer. Examples of distributed communication system includes Voice over IP (VoIP) teleconferencing systems, video conferencing systems, control systems, detection systems, accounting systems, and the like.

This approach enables the clients to sample data at different rates, but still be mixed or otherwise, operated on, in an encrypted format with high-quality playback at the same sample rate used by the client for encoding. The approach relies on an ability to normalize encrypted data sample rates in the context of an encrypted data mixer. The present approach is compatible with a variety of distributed communication schemes, such as encrypted VoIP teleconferencing using additive homomorphic encryption and ring switching.

In some embodiments, at the mixer, all encrypted data is switched to a common representation which contains the same amount of data. Any encryption system may be used with the system and method of the present invention that supports an additive homomorphism, key switching and representation switching to a common which could be implemented in a practical manner. A representational scheme is NTRU which can be made both Somewhat Homomorphic (SHE) and Fully Homomorphic (FHE), and which supports key switching and a type of representation switching called ring switching. For the representational NTRU scheme, all ciphertexts are able to be represented as integer vectors which are ring elements where the length of the vectors is the ring dimension. Switching rings enables us to change the size of these integer vector representations of ciphertexts. Two ciphertexts are in a common ring if their integer vector representations are the same length. The data is then mixed (or operated on), using any mixing (operation) approach available, and the resulting data is switched back to the same ring used by the intended client terminal.

Figure 1:
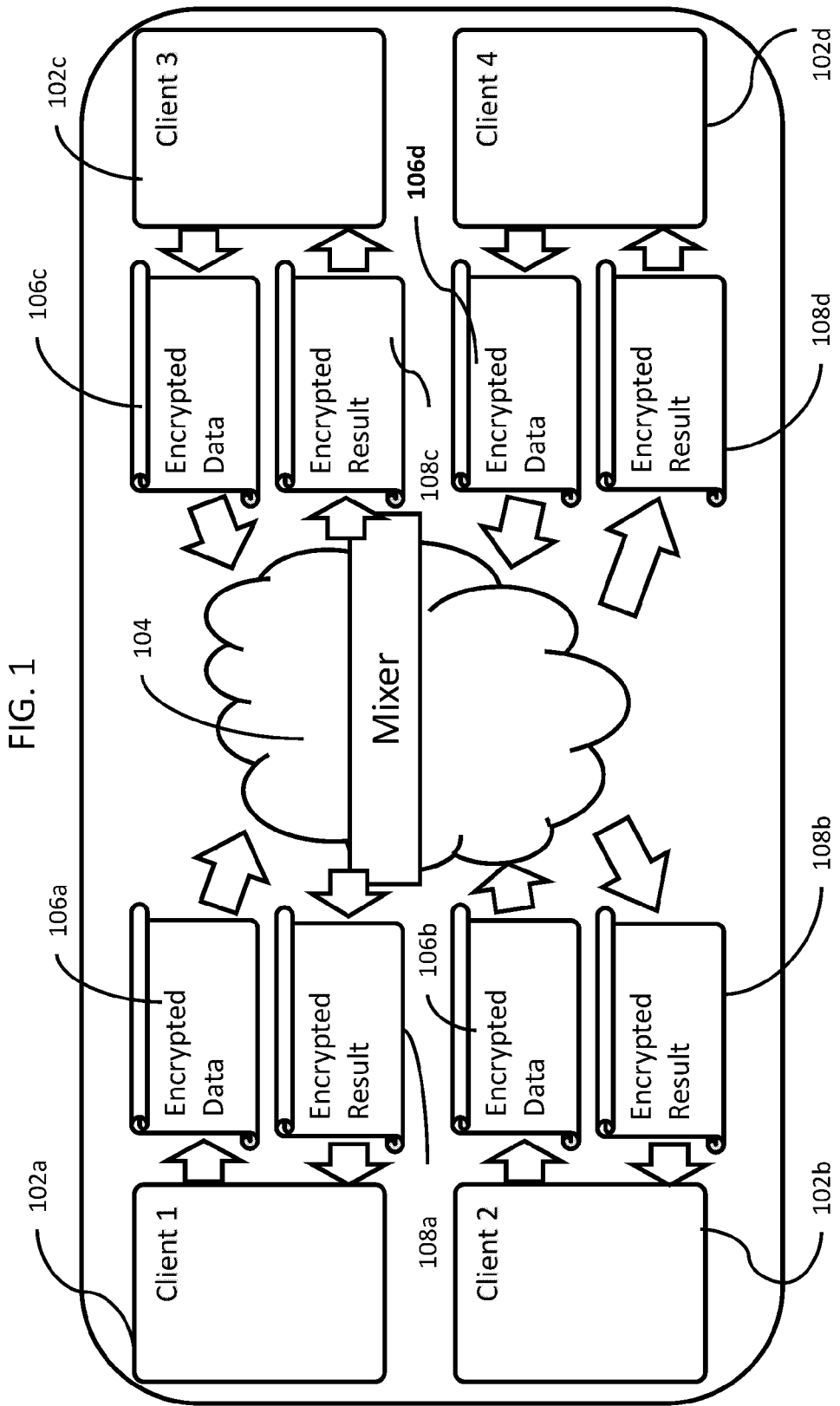
FIG. 1 shows an exemplary block diagram for a distributed communication system, according to some embodiments of the present invention.

FIG. 1 shows an exemplary block diagram for a distributed communication system, according to some embodiments of the present invention. Each of the clients 102a, 102b, 102c and 102d samples voice data (in the case of voice), encodes it, encrypts it and sends the encrypted data 106a, 106b, 106c or 106d to a mixer 104. The mixer 104 operates on the encrypted data and sends the results 108a, 108b, 108c and 108d back to the respective client terminals, which are then decrypted, decoded and played back (in the case of voice) to the respective clients.

Figure 2:
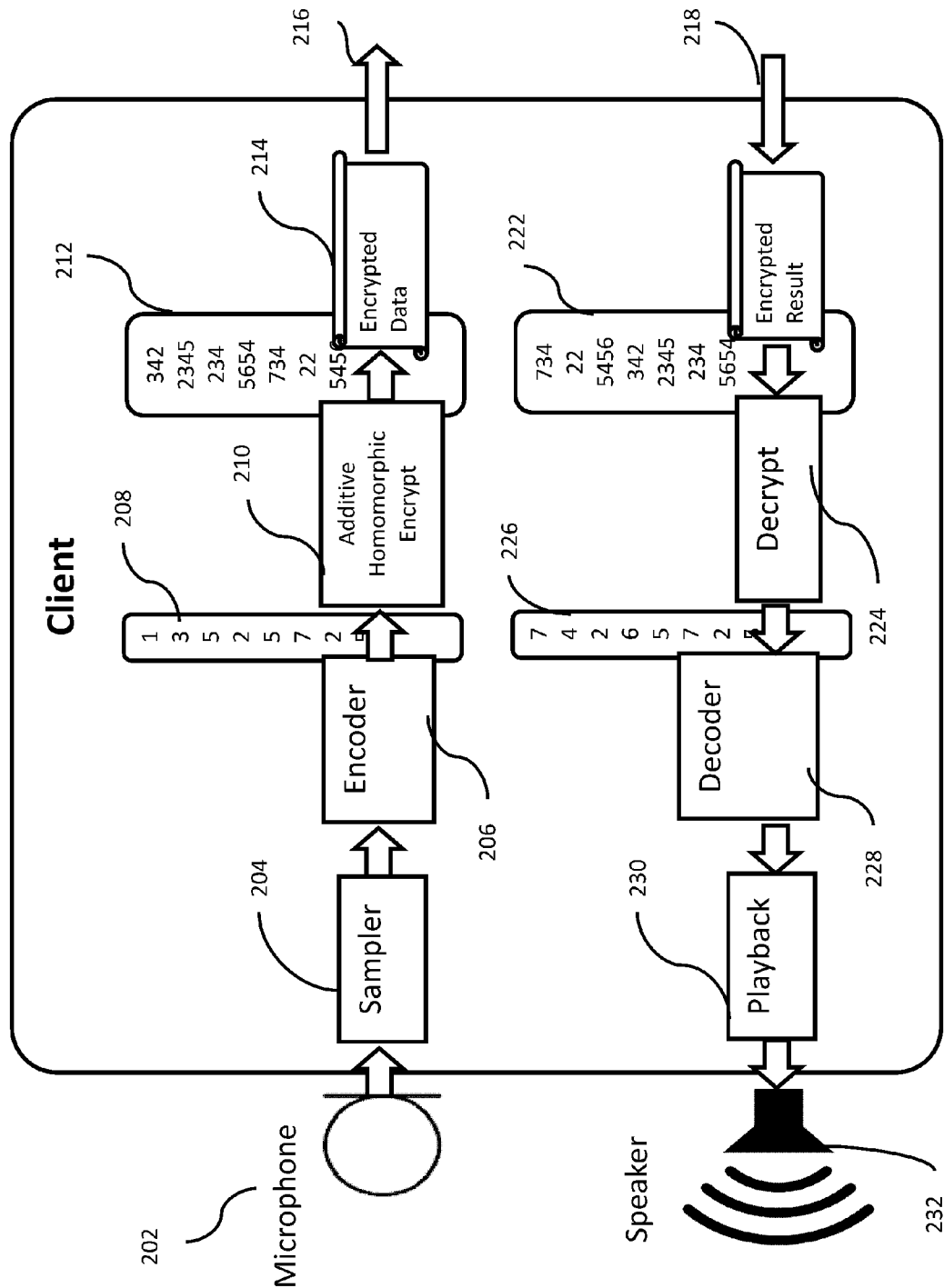
FIG. 2 shows data encryption and decryption by a client terminal, according to some embodiments of the present invention.

FIG. 2 shows data encryption and decryption by a client terminal, according to some embodiments of the present invention. The example illustrated by FIG. 2 relates to voice conferencing and includes a microphone 202 to capture the voice, a sampler 204 to sample the analog voice signals, and a playback 230 to play back the voice via a speaker 232. However, in case of general data communication without voice, microphone 202, sampler 204, playback 230 and speaker 232 may not be needed. As shown, a client terminal receives the voice data from a microphone 202, samples the voice data using the sampler 204 and feeds the sampled data to an (linear) encoder 206, which encodes the data and generates a data vector 208. The data vector 208 is then encrypted with client's private key by an additive homomorphic encryption module 210, using an additive homomorphic encryption scheme.

The encrypted data is represented by vector 212, which is then sent (216) to a mixer to be operated on. However, the data received from each client may have different bandwidth and/or frame size. When data with different bandwidth and/or frame size is encrypted, each encrypted data set would have a different ring size. Moreover, clients may be using different encryption and/or encoding schemes, which could produce vectors 212 of different length or rate. For the mixer to perform any mixing, encoding and/or other operations, on the combination of the vectors 212 from the plurality of client terminals, the vectors 212 from the clients would have to have a common ring size that can be shared.

After the mixing and/or other operations are performed, the encrypted result 218 is received from the mixer, for example, in the form of a vector 222. The result 218 is decrypted by a decryption module 224 to generate a vector 226 of decrypted data to be decoded by the decoder 628. In case of voice data, the decrypted data is played back (230) over a speaker 232. In the case of non-voice data communication, the decoded data is send to a desired destination, without any play back.

In some embodiments, an NTRU algorithm is used as a representational additive homomorphic encryption scheme which provides encryption and decryption functions. The NTRU encryption algorithm is lattice based, and its security is based on the shortest vector problem. Operations are based on objects in a truncated polynomial ring with convolution multiplication, where all polynomials in the ring have integer coefficients.

In some embodiments, the linear encoder 206 uses a variable encoding scheme to operate in different rings. Such an approach uses a control scheme analogous to transmission control protocol (TCP) to continually monitor, estimate and select bandwidth usage to maximize throughput.

Figure 3:
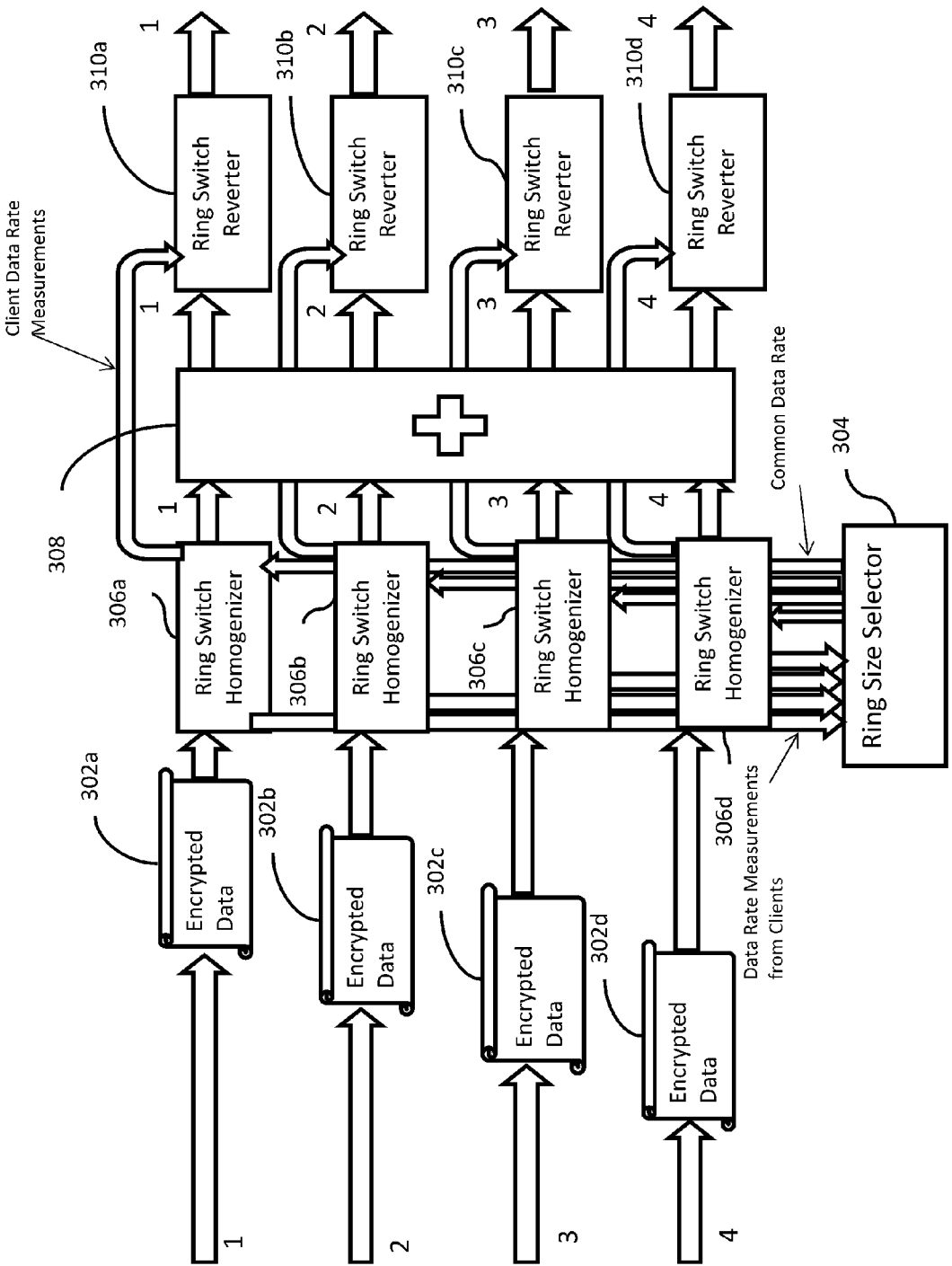
FIG. 3 is an exemplary block diagram for a variable rate mixer, according to some embodiments of the present invention.

FIG. 3 is an exemplary block diagram for a variable rate mixer, according to some embodiments of the present invention. This variable rate mixer is capable of switching all encrypted data to a shared (common) ring, before it mixes (or operates on) the encrypted data. As shown, data from clients 1, 2, 3 and 4, respectively is encrypted by the respective client, which results in encrypted data 302a, 302b, 302c and 302d that may have different ring size. Each of the encrypted data 302a, 302b, 302c and 302d is fed to a respective homogenizer 306a, 306b, 306c and 306d, before it is input to an operational unit (circuit) 308, for example a mixing logic. When data is sampled at the client, it is encoded at the same frame rate, but the sizes of the frames may be different to avoid data congestion over a communication network. The size of the frame depends on the length of ciphertext vector, which is the ring dimension. Because the frame rate is constant, but the ring dimension may vary, the data rate is a function of the ring dimension. Data rate for each of the encrypted data 302a, 302b, 302c and 302d is measured for its ring dimension. The measured ring dimension data is then fed to a selector circuit 304, for example, a ring size selector, which selects a shared ring size that all data should be switched to. In some embodiments, the ring size selector 304 uses a maximization function to select a shared ring size. In some embodiments this shared ring dimension is the minimum of all of the sampled ciphertexts. In some embodiments, the shared ring dimension is the maximum of all of the sampled ciphertexts. In some embodiments, the data rate or ring size information for each encrypted data is included in that encrypted data. In some embodiments, the ring size is the length of the ciphertext vectors.

The shared ring size from the ring size selector 304 is then input to each of the homogenizers 306a, 306b, 306c and 306d. Each of the homogenizers switches its input data to the shared ring size. The shared-ring encrypted data at the output of each homogenizer is then sent to the operational unit (circuit) 308, for example a mixing logic, to be operated on. Any appropriate homomorphic encryption mixer is feasible to be used with the present invention. The mixer output and the original ring measurements for each client encrypted data are then fed to a respective ring switch reverter 310a, 310b, 310c or 310d, which converts respective output data of the mixer to the same ring size used by the corresponding client terminal. In essence, each of the ring switch reverter 310a, 310b, 310c or 310d perform another ring switch on their input data to revert it back to the clients' original ring size. In some embodiments, instead of using a variable function in the ring size selector, a constant common ring dimension could be used that does not vary with the data sent by the clients.

Figure 4:
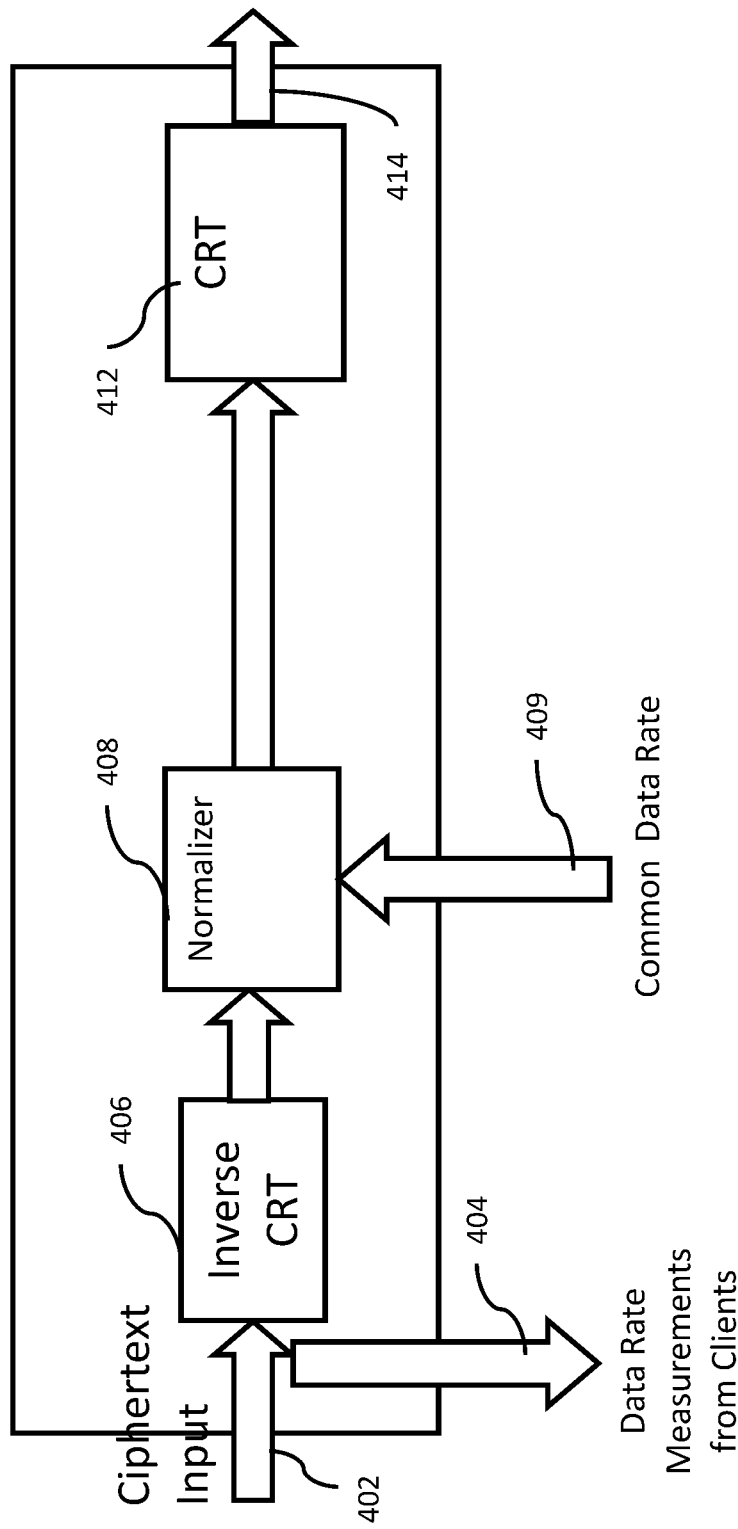
FIG. 4 is an exemplary block diagram for a ring switch homogenizer, according to some embodiments of the present invention.

FIG. 4 is an exemplary block diagram for a ring switch homogenizer, according to some embodiments of the present invention. The ring switch homogenizer translates the encrypted data to the common data representation using the selected common data rate. As illustrated, the ciphertext or encrypted data 402 from each client is measured to obtain data rate measurement information 404, before it is input to logic block 406.

In some embodiments, the logic block 406 performs a ring switch operation which is first done by taking an inverse Chinese remainder theorem (CRT) of the ciphertext or encrypted data 402 to convert ciphertext from a CRT representation to a power basis representation. The output of the logic block 406 is then fed to a normalizer 408. The normalizer takes the common data rate 409 as input and normalizes its input data to generate a ciphertext 410. In some embodiments, the normalizer 408 inserts constant-sized blocks of zeroes between other entries in the vector output of block 406 to change the ring dimension of the ciphertext.

In some embodiments, the encrypted sample queue 410 is then converted to a normalized length CRT 412 and input to the mixer (414). The CRT of the ciphertext then converts ciphertext from a power basis representation to a CRT representation.

In some embodiments, a single data sample in each ciphertext is encrypted. For these embodiments, the ciphertext frame size is constant but the frame rate varies. In some none-NTRU embodiments, this frame size is the ring dimension. In these embodiments, an alternative to the ring switch homogenizer is to drop ciphertexts with a uniform random distribution so that the mean rate of ciphertexts output by the homogenizer is common across all homogenizers.

Figure 5:
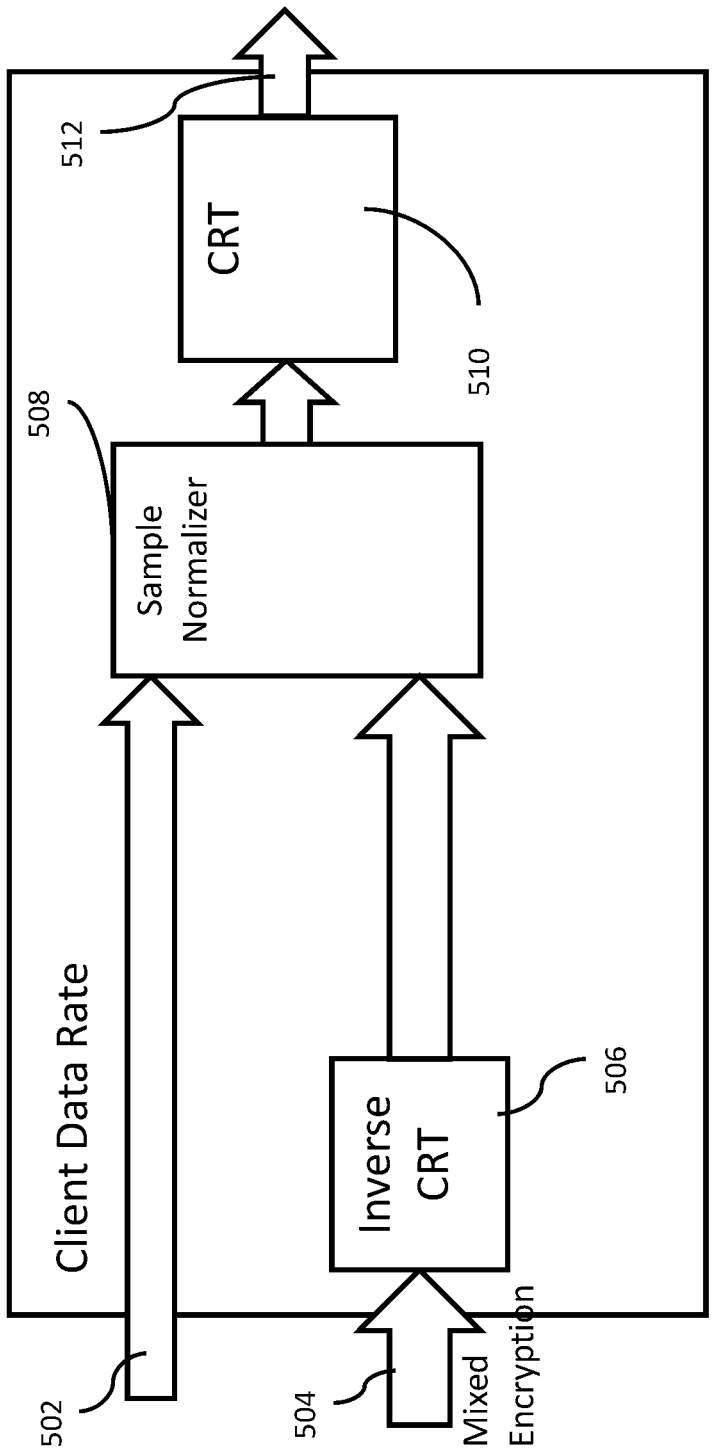
FIG. 5 is an exemplary block diagram for a ring switch reverter, according to some embodiments of the present invention.

FIG. 5 is an exemplary block diagram for a ring switch reverter, according to some embodiments of the present invention. The ring switch reverter switches the output of the mixer back to its original data representation, which is the clients' original ring size in some embodiments. As shown, the client data rate 502 and the output of the mixer 504 (e.g., mixed encrypted data) are input to a normalizer unit 508. The normalizer unit 508 performs normalization on the mixed encrypted data to obtain a switched length data vector which in some embodiments is sent to a CRT unit 510 which performs a CRT operation, which is then sent to the respective client terminal that generated the encrypted data.

In some embodiments, the ring switch reverter is a form of ring switching which operates by taking an inverse Chinese remainder theorem (CRT) of the ciphertext to convert ciphertext from a CRT representation to a power basis representation. The normalizer takes the client data rate as input and normalizes its input data to generate an encrypted ciphertext. In some embodiments, the normalizer inserts zeroes for every other entry in the vector output of block to change the ring dimension of the ciphertext.

In some embodiments, the outputs of the ring switch reverter 310a, 310b, 310c or 310d are combined (summed) in a matrix, in which each column of the matrix represents one of the encrypted data representation. The appropriate matrix column is then sent to the corresponding client. In some embodiments, the entire matrix may be sent to all the clients. Each client then extracts its own encrypted data representation (result) from the matrix.

In some embodiments, for example, in the case of voice communication, for the situation where a client would not want to receive its own voice data in the summation, the summation operations would be over a matrix addition where the added data in each column is the result for each client. This added column may be set to 0, if the corresponding recipient of the column is not intended to receive the voice data being added and all other columns would be the data being added. Redundant column data need not be carried through the process. For example, if cij represents the ciphertext from client i in the key j representation, the first summation would be [c22,c12,c12+c22]. The result of the 2nd summation would be [c23+c33,c13+c33,c13+c23,c13+c23+c33]. The result of a 3rd summation would be [c24+c34,c44, c14+c34+c44,c14+c24+c34,c14+c24+c34+c44].

Figure 6:
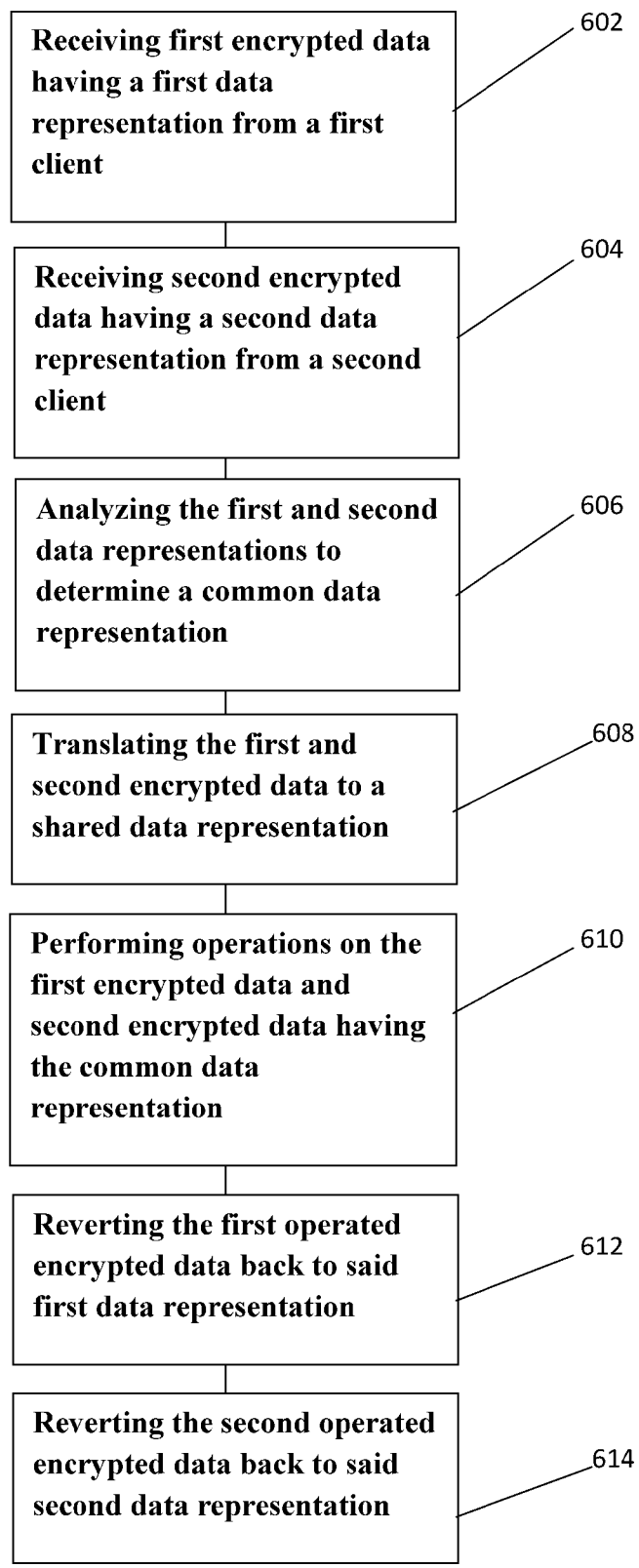
FIG. 6 is an exemplary process flow, according to some embodiments of the present invention.

FIG. 6 is an exemplary process flow, according to some embodiments of the present invention. In block 602, a first encrypted data is received from a first client terminal, the first encrypted data having a first data representation. A second encrypted data is received from a second client terminal, in block 604. The second encrypted data has a second data representation that is different than the first data representation. In block 606, the first and second data representations are analyzed to determine a common (shared) data representation, for example, a shared ring size for both the first and second encrypted data. As described above, the common data representation, for example, a shared ring size may be obtained from the first and second encrypted data, respectively to computed, for example, by a maximizing function.

In block 608, the first and second encrypted data are translated to a shared data representation, using the shared data representation. The shared data representation may be data having the same ring dimension or same vector size. Different operations, for example, mixing, encoding, summing, and/or encryption, are then performed on the first encrypted data and second encrypted data having the common data representation to generate a first operated encrypted data and a second operated encrypted data having the shared data representation, in block 610. In block, 612, the first operated encrypted data is reverted back to its original data representation. The reverted data is then sent back to the first client terminal for decryption by the first client terminal. Likewise, the second operated encrypted data is reverted back to its original data representation, in block 614. The reverted data is then sent back to the second client terminal for decryption by the second client terminal.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for data privacy in a distributed communication system, the method comprising:
    receiving first encrypted data from a first client terminal, the first encrypted data having a first data representation, including a first cyphertext ring dimension;
    receiving second encrypted data from a second client terminal, the second encrypted data having a second data representation, including a second cyphertext ring dimension, different than the first data representation;
    analyzing the first and second data representations, respectively including the first and second cyphertext ring dimensions, to determine a first data rate for the first encrypted data and a second data rate for the second encrypted data and to determine a common data representation, including a common cyphertext ring dimension for both the first and second encrypted data;
    translating the first and second encrypted data to a shared data representation having the same cyphertext ring dimension, using said common data representation including said common data rate;
    performing data operations on the first encrypted data and second encrypted data having the common data representation to generate a first operated encrypted data and a second operated encrypted data having the shared data representation, respectively;
    reverting the first operated encrypted data back to said first data representation including said first cyphertext ring dimension and sending a reverted first encrypted data to the first client terminal for decryption by the first client terminal; and
    reverting the second operated encrypted data back to said second data representation including said second cyphertext ring dimension and sending a reverted second encrypted data to the second client terminal for decryption by the second client terminal, wherein the common data representation is a constant common ring dimension that does not vary with the first and second encrypted data.

2. The method of claim 1, wherein said performing data operation further comprises performing a data mixing operation.

3. The method of claim 1, wherein the shared ring dimension is the minimum of all the ring dimensions for the first and second encrypted data.

4. The method of claim 1, wherein the shared ring dimension is the maximum of all the ring dimensions for the first and second encrypted data.

5. The method of claim 1, wherein the first data representation includes a first cyphertext vector size and the second data representation includes a second cyphertext vector size.

6. The method of claim 5, wherein said analyzing the first and second data representations comprising measuring data rate for the first cyphertext vector and the second cyphertext vector to determine a shared vector size for both first and second encrypted data.

7. The method of claim 1, wherein said translating the first encrypted data to the common data representation further comprises:
    performing an inverse Chinese remainder theorem (CRT) operation on the first encrypted data to generate first power-basis encrypted data; and
    normalizing the first power-basis encrypted data using the determined common data representation; and
    performing a CRT operation on the first encrypted data to revert to a Chinese remainder representation.

8. The method of claim 7, wherein said translating the first encrypted data to the power-basis data representation further comprises: performing a ring switch operation by taking an inverse CRT of first encrypted data to convert the first encrypted data from a CRT representation to a power basis representation.

9. The method of claim 1, wherein said reverting the first operated encrypted data back to said first data representation further comprises:
    performing an inverse CRT operation on the first operated encrypted data to generate first reverted encrypted data;
    normalizing the first reverted encrypted data using the first data representation for the first client terminal; and
    performing a CRT operation on the first encrypted data to revert to a Chinese remainder representation.

10. The method of claim 9, wherein said normalizing the first reverted encrypted data comprises inserting zeroes for every other entry in the first reverted encrypted data to change the data representation of the first reverted encrypted data.

11. The method of claim 1, wherein the distributed communication is voice communication, the method further comprising:
    sampling the voice signals received from the first and second client terminals, encoding the sampled signals and encrypting the encoded signals to generate the first and second encrypted data, respectively; and
    decrypting the reverted first and second encrypted data, decoding the decrypted data and playing back the decoded data by the first and second clients, respectively.

12. A data mixer system for data privacy in a distributed communication system comprising:
    a first input port for receiving first encrypted data from a first client terminal, the first encrypted data having a first data representation, including a first cyphertext ring dimension;
    a second input port for receiving second encrypted data from a second client terminal, the second encrypted data having a second data representation, including a second cyphertext ring dimension, different than the first data representation;
    a selector circuit for analyzing the first and second data representations including the first and second cyphertext ring dimensions, to determine a first data rate for the first encrypted data and a second data rate for the second encrypted data and to determine a common data representation, including a common cyphertext ring dimension for both the first and second encrypted data;
    a first and a second homogenizers for translating the first and second encrypted data to a shared data representation having the same cyphertext ring dimension, using said common data representation including said common data rate;
    an operational circuit for performing data operations on the first encrypted data and second encrypted data having the common data representation to generate a first operated encrypted data and a second operated encrypted data having the shared data representation, respectively;

a first reverter for reverting the first operated encrypted data back to said first data representation including said first cyphertext ring dimension and sending a reverted first encrypted data to the first client terminal for decryption by the first client terminal, respectively; and a second reverter for reverting the second operated encrypted data back to said second data representation including said second cyphertext ring dimension and sending a reverted second encrypted data to the second client terminal for decryption by the second client terminal, wherein the common data representation is a constant common ring dimension that does not vary with the first and second encrypted data.

13. The data mixer system of claim 12, wherein said operational circuit is a mixer logic for performing a data mixing operation.

14. The data mixer system of claim 12, wherein said first homogenizer performs an inverse CRT operation on the first encrypted data to generate first inverted encrypted data; and normalizes the first inverted encrypted data using the determined common data representation.

15. The data mixer system of claim 12, wherein said first reverter performs an inverse CRT operation on the first operated encrypted data to generate first reverted encrypted data; and normalizes the first reverted encrypted data using the first data representation for the first client terminal.

\* \* \* \* \*